United States Patent [19]

Maloney et al.

[11] Patent Number: 4,728,959

[45] Date of Patent: Mar. 1, 1988

[54] DIRECTION FINDING LOCALIZATION SYSTEM

[75] Inventors: John E. Maloney, Springfield, Va.; Charles N. Katz, Rancho Santa Fe, Calif.

[73] Assignee: Ventana Sciences Inc., Davis, Calif.

[21] Appl. No.: 894,867

[22] Filed: Aug. 8, 1986

[51] Int. Cl.$^4$ ................................................. G01S 5/04
[52] U.S. Cl. ..................................... 342/457; 342/465
[58] Field of Search ...................... 340/993, 989, 988; 455/33; 379/58, 59, 60, 63; 342/457, 357, 352, 356, 417, 465, 394, 442, 424

[56] References Cited

U.S. PATENT DOCUMENTS

| | | | |
|---|---|---|---|
| 2,437,695 | 3/1948 | Jansky | 342/465 |
| 3,445,847 | 5/1969 | Hammack | 342/465 |
| 3,747,104 | 7/1973 | Pansini | 342/457 |
| 3,864,681 | 2/1975 | Olive | 342/457 |
| 3,886,554 | 5/1975 | Braun et al. | 342/457 |
| 4,217,586 | 8/1980 | McGuffin | 342/380 |
| 4,229,620 | 10/1980 | Schaible | 342/457 X |
| 4,449,127 | 5/1984 | Sanchez | 342/194 X |
| 4,589,078 | 5/1986 | Rosenberg | 128/663 X |
| 4,596,988 | 6/1986 | Wanka | 342/457 |

FOREIGN PATENT DOCUMENTS 0028675  2/1983  Japan ................................. 342/357

Primary Examiner—Thomas H. Tarcza
Assistant Examiner—Tod R. Swann
Attorney, Agent, or Firm—Bacon & Thomas

[57] ABSTRACT

The present invention combines the relative insensitivity of the phase angle differences of a radio signal to the signal distortions inherent in an urban environment with digital signal processing techniques to produce an accurate and economical way to locate a mobile transmitter station such as a mobile telephone in a cellular telephone network. Phase angle measurements indicative of the angle of direction of a mobile transmitter station from each of a plurality of land stations are obtained by translated Hilbert transformation and are processed to produce a probability density function. The probability density functions are combined after a CHI-squared analysis to produce an area of uncertainty representing the position of the mobile transmitter station. The radio frequency signals emitted from the mobile transmitter station need have no special characteristic for the localization process. Thus, the present invention may easily work as an adjunct to an unrelated communications system such as a cellular telephone system.

9 Claims, 9 Drawing Figures

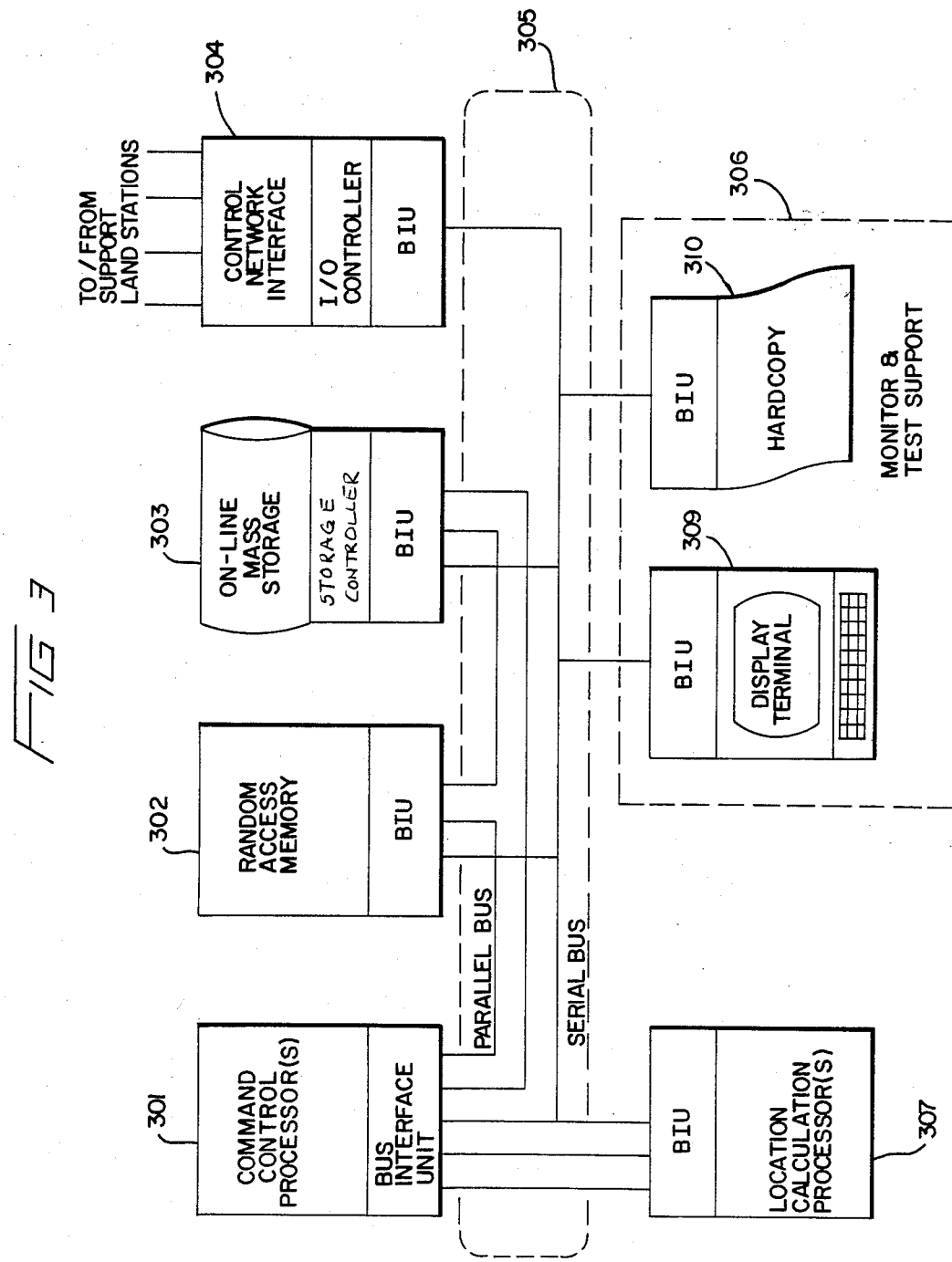

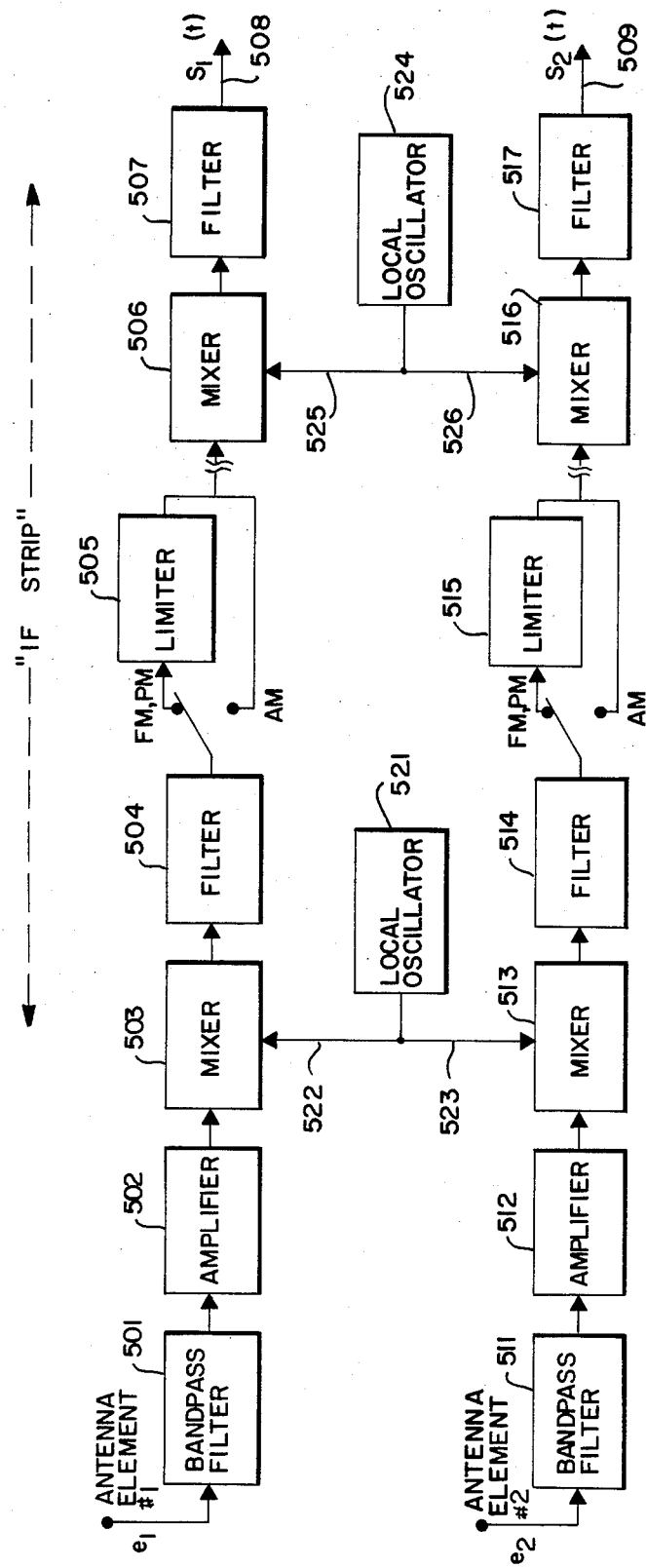

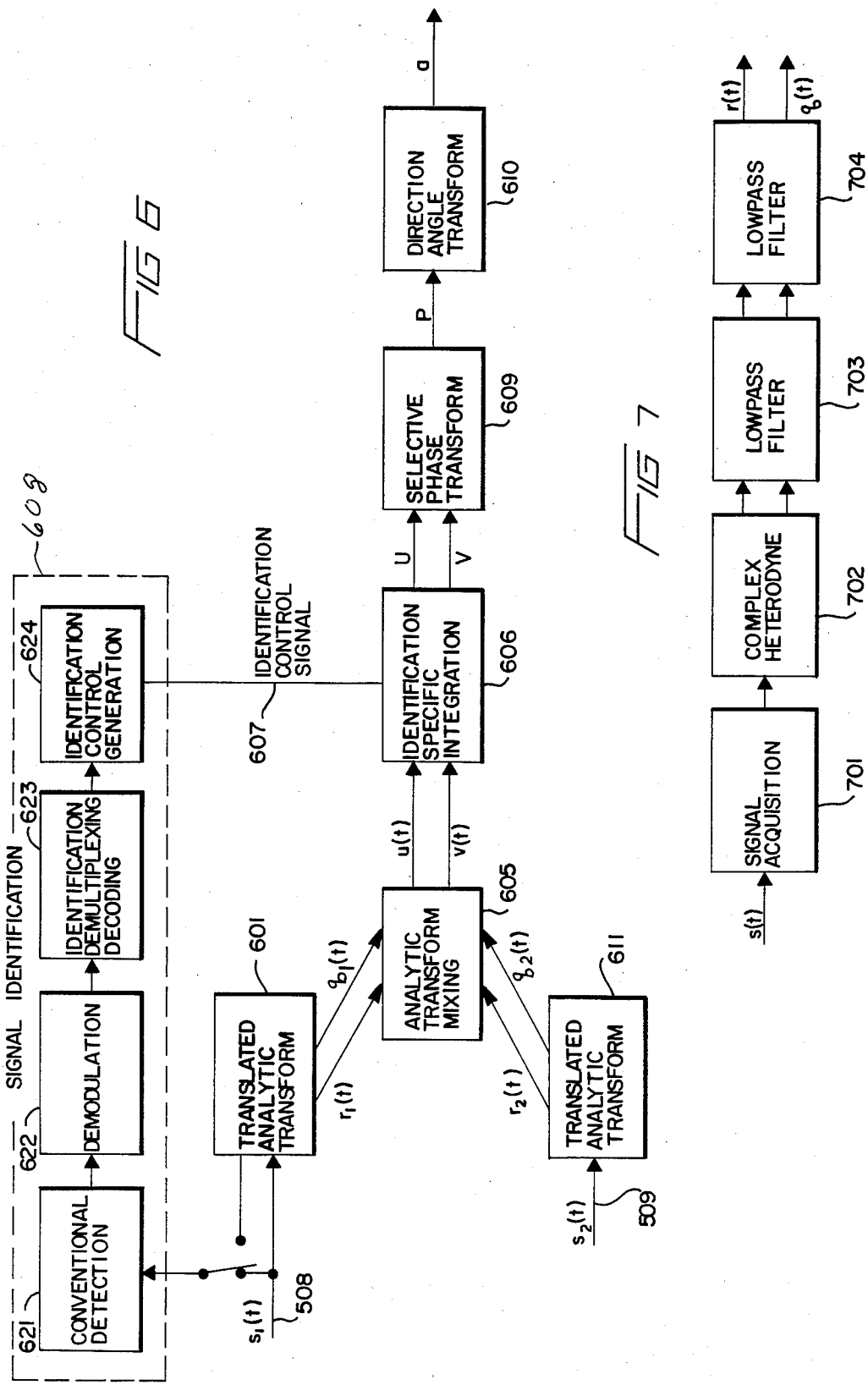

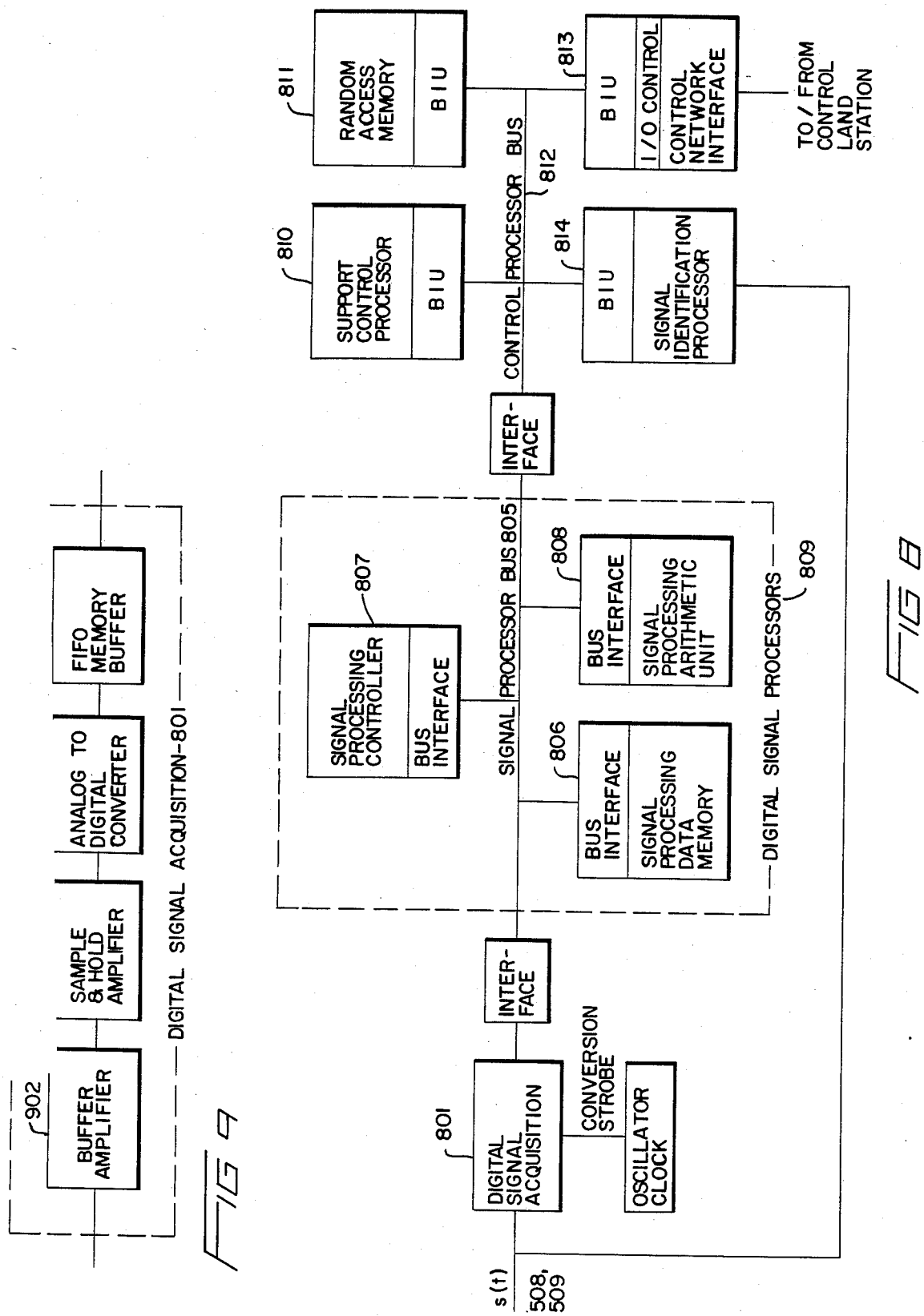

DIRECTION FINDING LOCALIZATION SYSTEM

BACKGROUND OF THE INVENTION

1. Field of the Invention

The present invention relates to a method and apparatus for determining the location of a mobile radio transmitter, especially a mobile radio transmitter positioned in the service area of a cellular communications telephone system.

2. Description of Related Art

Many attempts have been made over time to meet a recognized need for quickly and accurately determining the position of a mobile radio transmitter. A radio transmitter may typically be attached to a vehicle which would enable the vehicle to be localized for purposes of protecting endangered cargo or persons, controlling the deployment of delivery trucks in an urban area or any other of a number of applications.

Several localization systems are presently commerically available. Some of the systems use navigational instruments such as ring laser devices. Others use magnetic field sensors that are sensitive to the earth's magnetic field. Yet another type uses radio beacons such as the LORAN-C system. While the systems perform satisfactorily, they are not suited for consumer use due to their inherent complexity and cost as well as the need for frequent reinitialization or calibration.

Another system for determining geographic position involves a small radio receiver to receive signals from the global positioning (GPS) system. The GPS system offers the potential to produce a three-dimensional position anywhere on the surface of the earth to within a few feet. Radio receivers for the GPS system have become relatively inexpensive. The GPS system, however, has yet to be deployed because no launch vehicle exists that can both reliably and economically launch commercial communication satellites on schedule. Further, present satellite communication systems provide coverage only for large geographic areas. Even if the GPS system does become operational, no satellite system will exist that can record the position of a large number of terrestrial vehicles in a small geographic area such as a city. While proposals have been made to orbit communications satellites that can service small geographic areas, no satellite system presently scheduled for launch in at least the next decade would permit reusing radio frequency channels. Thus, any satellite-based vehicle location system would be inefficient in utilizing limited radio frequency space.

Several attempts have been made over time to use terrestrial based radio direction finding and positioning systems. One type of radio positioning system measures the time required for a radio signal to travel between a mobile transmitter station and fixed antenna locations. Time difference measurements are obtained by comparing the wide band signal wave forms transmitted from the mobile station with some form of pulsed amplitude modulation or specific coding modulation so that the timing resolution and related position resolution is proportional to the inverse of the signal bandwidth. Yet another radio positioning system uses time difference measurements obtained by comparing narrow band signal wave forms to obtain a difference in the phase of the received signal. The radio frequency signals have a wavelength comparable to the separation of the antenna sites and the ability to resolve the location of the mobile transmitter station is proportional to the wavelength of the signal. Either radio positioning system, however, requires synchronizing separated antenna sites. The synchronization requirement may be overcome by adding a special, known wave form to the radio signal. The waveforms received at each receiver, however, must be compared to determine the position of the mobile transmitter station. The common waveforms must be impressed on the signal by special equipment. Further, the waveforms must not be distorted by any intervening interference.

A simpler method of determining the location of a mobile radio transmitter station involves measuring the angle of arrival of a radio signal at a number of fixed locations and then determining the area in which all the direction angles cross. One way to determine the direction angle is to electronically compare the difference in phase of the radio signal that is received by different antenna elements at a receiver site. Positioning the two antenna elements approximately ½ wavelength apart produces a narrow band intersignal phase difference which is proportional to the sine of the angle at which the signal is received.

Since most vehicles operate in an urban setting, it is highly desirable that any vehicle location system operate in an urban environment. A moving vehicle in an urban environment, however, seldom has a direct line-of-sight path to a receiver station. Rather, the propagation path contains many obstacles in the form of buildings and other structures, hill, and other vehicles which may be either landborne or airborne. The absence of a unique propagation path between the vehicle and the receiver station causes the instantaneous signal strength of any radio signal emitted from the vehicle to be highly variable at the receiver station. Indeed, it is known that the main propagation features of a radio signal in an urban environment are produced by multipath interference and shadowing of the direct line of sight path by intervening features of the terrain. Multipath interference typically corresponds to so called Rayleigh signal fades. The signal fades occur because of plane wave interference and are separated by a ground distance of approximately one half wavelength apart. Multipath interference produces irregularly varying patterns of constructive and destructive interference as the mobile radio transmitter station moves through the service area which causes the radio frequency signal to fluctuate in amplitude, travel time and propagation direction. The exact position of any maxima or minima also depends on the wavelength of the radio frequency signal. Data which is transmitted during a deep fade typically is lost. Thus, multipath interference produces a complicated pattern of signal distortion which is an inherent characteristic of RF transmissions in an urban environment.

It is known that shadowing and multipath interference does not distort the frequency or the phase of a radio frequency signal as much as its amplitude and travel time. Thus, the relative insensitivity of frequency modulation to multipath interference has encouraged its use in cellular telephone systems which operate in, for example, the 800–900 MHz frequency bands. Shadowing and multipath interference nevertheless cause the apparent position of the mobile radio transmitter to randomly change with time so as to severly limit the accuracy and, hence, the applicability of the above mentioned phase difference technique of radio position locating to solving the problem of localizing a large number of vehicles in an urban environment.

SUMMARY OF THE INVENTION

The present invention combines the relative insensitivity of the phase angle differences of a radio signal to the signal distortions inherent in an urban environment with digital signal processing techniques to produce an accurate and economical way to locate a mobile transmitter station such as a mobile telephone in a cellular telephone network. Phase angle measurements indicative of the angle of direction of a mobile transmitter station from each of a plurality of land stations are obtained by translated Hilbert transformation and are processed to produce a probability density function. The probability density functions are combined after a CHI-squared analysis to produce an area of uncertainty representing the position of the mobile transmitter station. The radio frequency signals emitted from the mobile transmitter station need have no special characteristic for the localization process. Thus, the present invention may easily work as an adjunct to an unrelated communications system such as a cellular telephone system.

In the preferred embodiment of the present invention, a transmission from the mobile transmitter station is received by at least two land stations. Receivers at at least two antenna elements identify the signal as coming from the target mobile transmitter station and reduce the frequency of the signal to correspond to the processing speed of digital signal processing circuitry. Processing units at the land stations determine complex phasor relationships between the antenna elements that represent the conjugate product of the signals in the two antenna elements corresponding to the phase of the radio signals in each antenna element and the direction angle to the mobile transmitter station from the land station. The phasor relationship is dependent on the amplitude of the recorded signal and weighted by a predetermined threshold so that the phasor is integrated with time to form a dynamically determined probability density function. The wavelengths of the signals preferably are short enough, e.g. HF, VHF and UHF, so that the antenna elements are closely spaced at a common land station and each element receives a signal of common phase evolution. The measured direction angles from at least two, and preferably more, land stations are combined at a control land station to determine the position of the mobile transmitter station.

The control land station applies a non-linear least-squares analysis to the raw data. Rather than selecting two or more "best" direction angle measurements to determine location, the present invention analyzes all available direction angle measurements for temporal and internal statistical, or CHI-squared, consistency so as to mitigate multipath interference in the direction angle. The control land station generates an area of uncertainty from the density functions associated with the direction angle measurements.

For a radio frequency system having a limited range of frequencies, both frequency division multiplexing and time division multiplexing are used to accommodate a number of mobile transmitter stations. The mobile transmitter station emits a signal which need have no special characteristic. The present invention is well adapted to operate as an adjunct to existing cellular communications systems of a type that are presently serving most urban areas.

BRIEF DESCRIPTION OF THE DRAWINGS

FIG. 3 is a block diagram showing an apparatus for performing the localization functions shown in FIG. 2;

FIG. 5 is a block diagram of an analog receiver for synchronizing the pairs of phase element antennas shown in FIG. 4;

FIG. 6 is a flow chart of a digital receiver for processing the phase angle measurements obtained from the receiver of FIG. 5;

FIG. 7 is a more detailed flow chart of the translated analytic transform block of FIG. 6;

FIG. 8 is a block diagram of a system for implementing the signal processing functions of the digital receiver shown in FIGS. 6 and 7; and FIG. 9 is a detailed block diagram of the digital signal acquisition block shown in FIG. 8.

DETAILED DESCRIPTION OF THE PREFERRED EMBODIMENT

Figure 1:
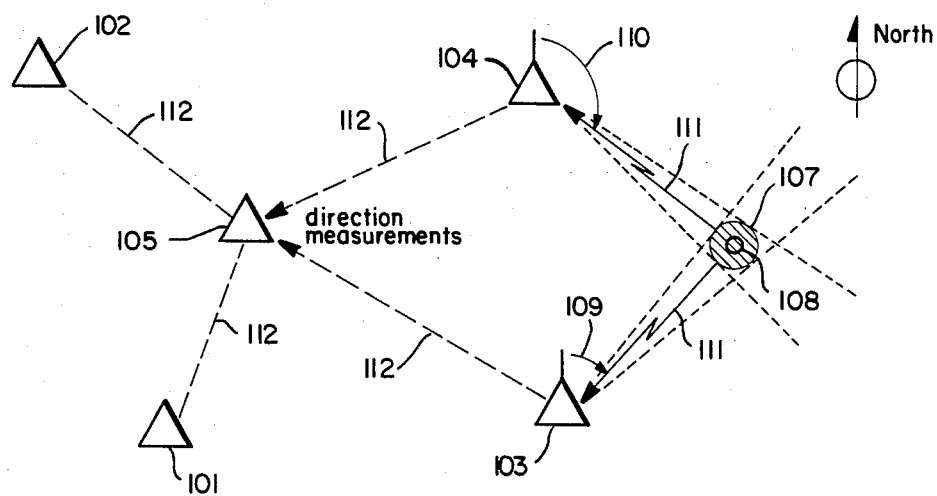
FIG. 1 illustrates the localization of the present invention using a network of land stations to obtain direction angle measurements for a mobile transmitter station.

FIG. 1 shows a network of land stations 101–105 such as typically comprise a cellular telephone network. A mobile radio transmitter station 108 radiates a RF signal 111 which is received by at least two land stations, 103, 104. The RF signal 111 may be any RF emission such as protocol signals emitted by a portable telephone in a cellular telephone network. The support land stations 103, 104 determine direction angles 109, 110 relative to a fixed reference direction such as north. The direction angles are transmitted to a control land station 105 by way of the communications and control system of the localization network 112. The communications link may be standard modems, telephone land lines, microwave links, etc., of types that are well known in the art. The control land station determines an area of uncertainty 107, with central position 108, according to the standard deviation of the measured angles of direction 109, 110.

Figure 2:
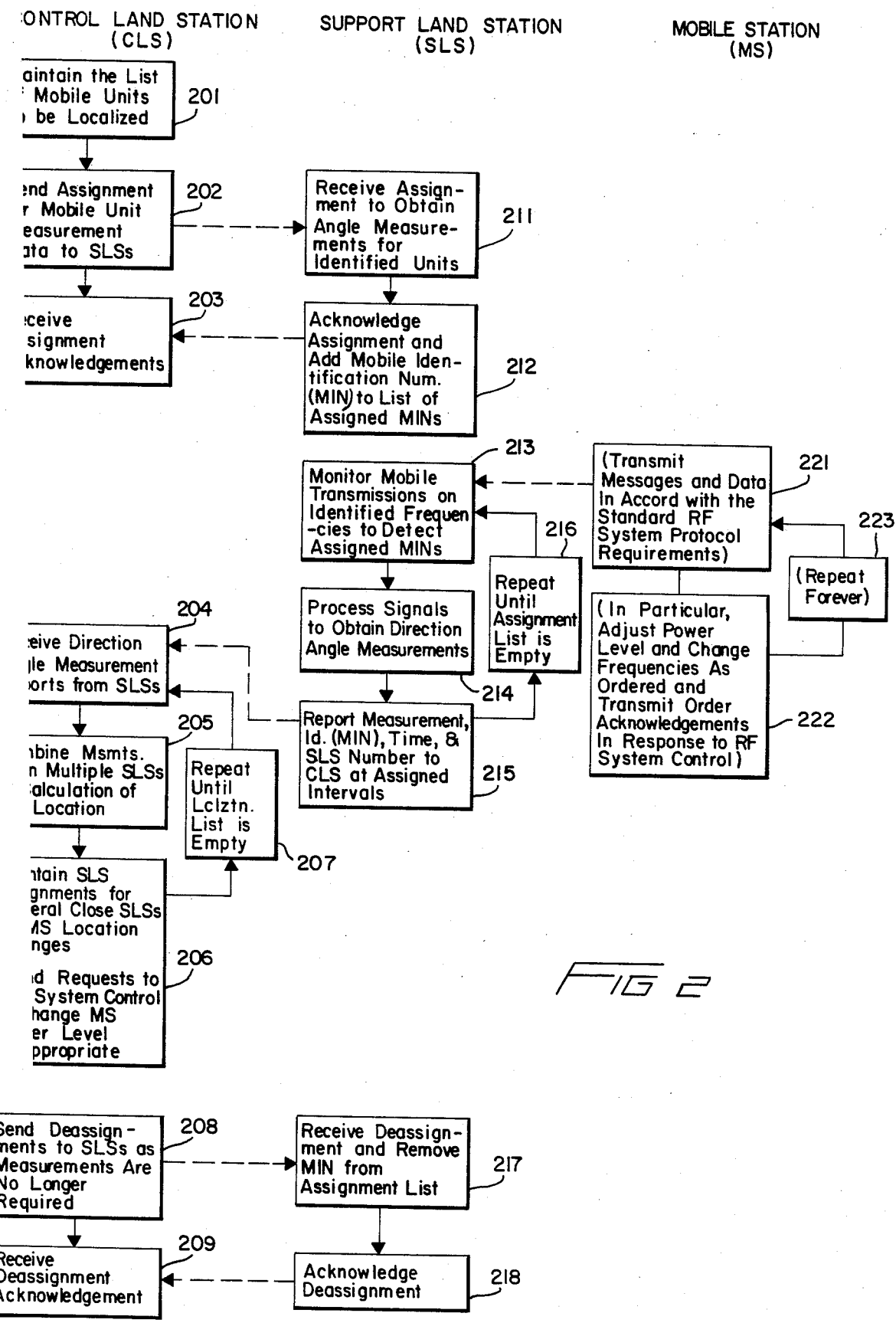
FIG. 2 is a flow chart showing various interactions of the stations shown in FIG. 1.

FIG. 2 shows the functional interaction of the mobile transmitter, support land stations and control land station shown in FIG. 1. The control land station maintains a list of the mobile transmitters to be localized as shown at step 201. For each transmitter that is to be localized, the control land station assigns support land stations to measure angles of direction of a mobile transmitter to step 202. Which land stations are used for the localization depends on whether the land station is in range of the RF signal, the number of localization requests directed to a particular land station at a given moment and frequency, and the maximum number of localization requests that a given land station can handle at once. The support land stations receive the request to measure the direction angle of a particular mobile transmitter at step 211 and acknowledge receipt of the request at step 212 by the identification number of the mobile transmitter station to be localized. The control land station receives the acknowledgment at 203 and stops attempting to form the subset of base support land stations once all stations, or at least a reasonable number of stations, have acknowledged their localization assignments. The control land station then waits for the support land stations to begin returning angle measurements.

As indicated in step 213, the support land station monitors the transmissions of the mobile transmitter station at the prescribed frequencies and processes the signals at step 214 to obtain a measurement of the direction angle. All direction angle measurements obtained for mobile transmitters on the localization list are reported to the control land station at 215 at predetermined time intervals. The support land station continues to monitor for a predetermined period of time all mobile transmitters on the localization list as indicated at step 216 until a direction angle measurement has been returned for each on the assumption that eventually the mobile transmitter broadcasts a protocol messages at step 221. These protocol messages may be modified as necessary at step 222 to allocate frequency space in the service area and maintain sufficient signal strength at the support land stations for the localization and communication processes. The process of modifying the signal from the message for the mobile transmitter is analogous to the hand-over process for transferring between cells in a cellular telephone network except that the control land station may adjust the frequency and strength of the signal from the mobile transmitter station to be received at more than one station. The foregoing process is repeated essentially forever as indicated at step 223 as is customary for a mobile telephone in a cellular telephone network.

At step 204 the control land station receives the measurements of the direction angles from the suppor land stations. The control processor of the control land station combines the direction angle measurements for each mobile transmitter at step 205 to determine the position of the mobile transmitter station. The control land station reassigns the support land station as necessary at step 206 or instructs the mobile transmitter station to adjust its radiated power or operating frequency as discussed above. The localization process is repeated as shown at step 207. Finally, the control land station instructs the support land stations to disengage the localization procedure at 208 once localization is is no longer required. The support land stations receive and acknowledge the disengagement instructions at steps 217, 218, respectively. The control land station acknowledges the receipt of the disengagement acknowledgement at step 209 and terminates the localization process.

In an alternate embodiment of the present invention, a systems network control center may assign different land stations to function as the control land station and support land station as required to localize a particular mobile transmitter station. The functions of the individual land stations would change as the mobile transmitter station moved through the service area of the network. The distribution of control land stations across the network would be determined by the location of mobile transmitter stations in the service area as well as the list of support land stations assigned to each mobile transmitter station. Similarly, each support land station would maintain a list of all mobile transmitter stations and control land stations for which it was responsible for reporting directional data and the control land station to which the directional data is to be sent. Considering the example of a cellular communications telephone system, the distribution of functions for both the control land stations and support land stations may be performed at the same cell site responsible for maintaining telephone service to the mobile telephone which corresponds to the mobile transmitter station. The functions of the support land station may be performed by the receiver station for at least one, and preferably more, neighboring cells.

FIG. 3 presents a block diagram of the data processing equipment required for implementing the command and control processing steps at the control land station shown in FIG. 2. The command and control processor 301 includes a bus interface unit for communicating with and controlling the various components of the control land station along data bus 305. As presently contemplated, the command and control functions would be performed using 32-bit microprocessor technology such as found on, for example, the Motorola MC68020 or Intel 80386 chips in combination with a Motorola VME bus or Intel Multibus II, respectively. Command and control processor 301 has access to additional memory through RAM expansion module 302 and even greater masses of data through mass storage device 303 through appropriate bus interface units and storage control units. Network interface unit 304 connects the command and control processor with the support land stations. An interactive terminal 309 and hard copy device 310 may be added to data bus 305 as represented by box 306. A system which integrates the above elements with the Motorola MC68020 microprocessor is the system 19 family of advanced systems platforms produced by Counterpoint Computers of San Jose, Calif. Additionally, a location calculation processor 307 may be connected along the data bus to speed the necessary positioning calculations. In the preferred embodiment of the present invention, the location calculation processor 307 would be integrated with the control facilities and operate on the same 32-bit processing technology. This integrated system uses floating point arithmetic such as is provided on a Motorola MC68881 chip.

Command and control processor 301 controls the interrupt driven multitasking operating system by executing the pre-programmed localization control tasks. For example, one basic task is maintaining the list of mobile transmitters which are to be localized. Localization requests may be entered from a display terminal 309 or a remote user terminal through a network interface such as unit 304 and stored in storage units 302 or 303. Control network interface unit 304 communicates requests for direction angle measurements to the support land stations. Command and control processor 301 receives the measurements of the direction angle from the support stations through network 304. The direction angle measurments are associated with their corresponding identification numbers and stored for eventual localization processing. Localization calculation processor 307 periodically retrieves the direction angle measurements for a particular mobile transmitter and determines its position. The positional information returns to command and control processor 301 which stores the information in an appropriate list corresponding to the mobile transmitter station that was localized. The results of the localization process may be displayed on demand either at local display terminal 309 or at a remote location through a network interface control such as a unit 304.

Figure 4:
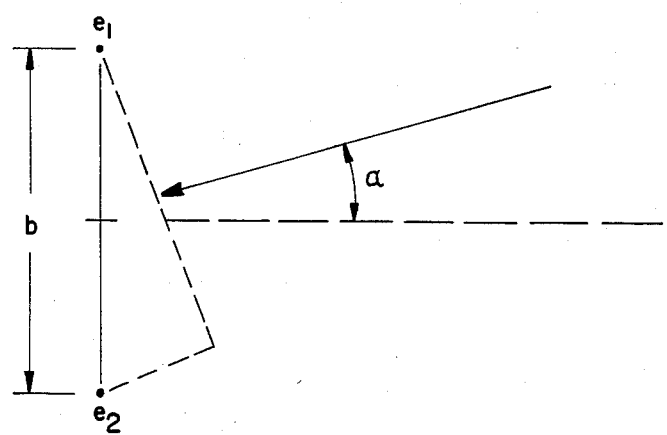
FIG. 4 illustrates an antenna arrangement for the preferred embodiment of the present invention.

FIG. 4 shows a configuration of paired whip monopole or dipole antenna elements that may be used to measure the angle of direction of a mobile transmitter station cheaply and accurately. Two antenna elements, $e_1$ and $e_2$, are separated by base line distance b and receive a signal along direction angle a which is measured relative to the perpendicular bisector of the base line connecting the antenna elements. Assuming that the mobile transmitter is sufficiently far from the antenna that the RF signal from the mobile transmitter station is a plane wave when it arrives at the antenna, the RF signal travels an additional distance b sin a from the first antenna element $e_1$ to reach the second element $e_2$. Thus, the electronic analog of the RF signal in the antenna elements have a phase difference corresponding to:

$$p = 2\pi(f/c)b \sin a;$$

where f is the frequency of the RF signal, c is the speed of propagation of the RF signal, which is essentially the speed of light, and b represents the spacing of the antenna elements which is preferably approximately equal to one half a wavelength of the RF signal or c/2f. The direction angle a is obtained by measuring the difference in phase between the same signal arriving at each antenna element. The direction angle may be expressed as:

$$a = \sin^{-1}[pc/(2\pi fb)];$$

and the standard deviation s.d. corresponding to the variation of the angle measurement is:

$$s.d. = [c/(2\pi fb \cos a)] \times s.d._p,$$

where $s.d._p$ represents the standard deviation of the phase of the RF signal. It is to be appreciated that the RF signal may have a significant, independent standard deviation because of factors such as multipath interference while the standard deviation of the phase difference of the signals received at the closely spaced antenna elements is comparatively small.

As expressed above, the angle uncertainty is exceedingly large if the direction of arrival is nearly parallel to the base line so that cos a approaches zero. The preferred embodiment of the present invention uses an antenna configuration having three or more pairs of elements, for a total of six elements, which may be paired to measure the phase angle. The element pairs may be situated at the vertices of an equilateral triangle which is attached to a common antenna mast. Phase relationships are measured between the elements at each of the three pairs of elements and the control processor of the land station selects the antenna pair in which the signal on the antenna elements arrives most nearly at the same time. The antenna array never measures a direction angle of more than 60 degrees so that the angular resolution of the antenna pairs is never degraded by more than a factor of 2. Thus, if the interelement base line is equal to ½ the wavelength of the RF signal, then the directional resolution stays within the limit $$s.d. \leq 0.637 \; s.d._p.$$

The random uncertainties in the measured phase relationships are compounded by physical uncertainties as to the separation and orientation of the pairs of antenna elements. These relationships, however, may be mitigated by calibrating the antennas once installed and thereafter periodically maintained by measuring the directions to the known positions of neighboring land stations.

FIG. 5 is a block diagram of an analog receiver for synchronizing the pairs of phase element antennas of the present invention. The radio frequency signal received at antenna element pairs $e_1$ and $e_2$ is supplied to bandpass filters 501 and 511 and an amplifier stage 502,512, respectively. Signal lines 522 and 523 supply mixers 503 and 513 with the same clock signal from local oscillator 521 so as to maintain the phase relationship of the RF signals received by antennas $e_1$ and $e_2$. Additional mixers, such as 506 and 516 may be added to the IF strip so long as each pair of mixers is connected to a common local oscillator 524 by appropriate signal lines 525,526.

In addition, the signals from each element of the antenna pass through filter stages 504, 514, 507 and 517 so that the RF strip passes only the appropriate frequency of RF signal. Further, limiter stages 505 and 515 may be desirable where the signals of interest have been modulated by either a discrete phase or frequency shift keying, or by continuous phase or frequency variation. As shown in FIG. 5, conventional limiter stages are inserted after the first mixer stage to reduce any amplitude modulation effects produced by, for example, additive noise or propagation fluctuations caused by multipath interference. The amplitude of the respective signals may be further equalized in succeeding quadranture transform stages as discussed below. All necessary analog receiver devices illustrated in FIG. 5 are well known in the art and not a subject of the present invention.

Eventually, the signals from antenna elements $e_1$ and $e_2$, $s_1(t)$ and $s_2(t)$ respectively, are tapped from the IF strip and fed to a signal processing stage, an exemplary block diagram of which is shown in FIG. 6. The point at which the RF signals are tapped depends on the processing speed of the digital signal processing stages. Once tapped, the signal from each antenna element undergoes a translated Hilbert transform to produce an analytic signal from which the phase difference may be accurately determined. The Hilbert transform of s(t) is defined as $$\hat{s}(t) = P\left[\frac{1}{\pi} \int_{-\infty}^{\infty} \frac{s(t)}{t - t} dt\right]$$

where P denotes the cauchy principal value of the integral. The Hilbert transform may be expressed as the convolution $$\hat{s}(t) = \frac{1}{\pi t} \cdot s(t)$$

Since the Fourier transform of $1/\pi t$ is represented as $$\mathcal{F}\left[\frac{1}{\pi t}\right](f) = -i \, \text{sgn}(f) = \begin{cases} -i, f > 0 \\ 0, f = 0 \\ +i, f < 0 \end{cases}$$

it follows that the Fourier transform of the Hilbert transform $\hat{s}(t)$ is $$\mathcal{F}[\hat{s}](f) = -i \, \text{sgn}(f) \times \mathcal{F}[s](f)$$

An analytic signal is defined as $$y(t) = s(t) + i\,\check{s}(t)$$

Thus, the Fourier transform of the analytic signal is $$\mathcal{F}[y](f) \equiv Y(f) = \begin{cases} 2S(f), & f > 0 \\ S(o), & f = 0 \\ 0, & f < 0 \end{cases}$$

where $S(f) \equiv \mathcal{F}[s](f)$ is the Fourier transform of the original signal s(t). Hence, the analytic signal y(t) as formed by the quadrature combination of the signal s(t) and its Hilbert transform $\check{s}(t)$ consists of only the positive frequency components of s(t). Expressed in the alternative, $$y(t) = a(t)e^{i\phi(t)};$$

i.e. the analytic signal comprises a time variant amplitude signal a(t) and time dependent, "instantaneous phase" signal $\phi(t)$. In addition, the analytic signal can be frequency translated to take the form $$z(t) = e^{-i2\pi ft} \times y(t)$$
$$= r(t) + iq(t)$$

where z(t) is a complex valued signal with both positive and negative frequency components that are equal to the positive frequency components of y(t), albeit offset in frequency by an amount represented as f. Thus, if the signals from two antennas, $s_1(t)$ adn $s_2(t)$, are transformed into analytic signals $y_1(t)$ and $y_2(t)$, the corresponding frequency translated forms are $$z_1(t) = e^{-i2\pi ft}y_1(t); \text{ and}$$

$$z_2(t) = e^{-i2\pi ft}y_2(t),$$

and the conjugate product of $z_1(t)$ and $z_2(t)$ is the same as the conjugate product of $y_1(t)$ and $y_2(t)$ taken directly. Thus, the difference in the phase between two signals may be determined directly from the translated analytic signals.

The foregoing discussion is not intended to be an exhaustive discussion of the use of Hilbert transforms in signal processing. The use of Hilbert transforms is discussed by Oppenheim and Schafer, *Digital Signal Processing*, 337–375 (1975), and Brown, *Hilbert Transform Product Theorem*, Proceedings of the IEEF, No. 3, March 1986, and references cited therein. Rather, the foregoing discussion is intended to illustrate a particularly efficient and accurate method for measuring the difference in the phase between two radio frequency signals. A person of ordinary skill in the art will readily appreciate that the foregoing method of signal processing will produce a more accurate measurement of the apparent direction angle to a mobile transmitter unit than used in the prior art and, therefore, represents an substantial advance in the state of the art.

Referring to FIG. 6, signal $s_1(t)$ and $s_2(t)$ are time varying signals from an antenna element which are formed into complex valued signals or phasor signal pairs r(t), q(t) at analytic transform steps 601, 611, respectively. FIG. 7 shows the details of the translated analytic transform. The real-valued signal is acquired at step 701. The complex signal is frequency translated by a complex heterodyne unit at step 702 and filtered through lowpass filters at step 703 and 704 to form a translated representation of the analytic signal in the form of quadrature combinations of the original signal s(t) as well as the Hilbert transform of s(t). A mixing stage for the analytic transforms 605 combines the components of both antenna element pairs to obtain a phasor signal pair as follows:

$$u(t) = r_1(t)r_2(t) + q_1(t)q_2(t); \text{ and}$$

$$v(t) = r_1(t)q_2(t) - q_1(t)r_2(t).$$

The analytic transform signals are effectively integrated by integrator 606 in response to an indentification control signal communicated along line 607 from signal identification unit 608. Signal identification unit 608 contains a conventional detection circuit 621 connected to a demodulator 622. An identification demultiplexing and decoding stage 623 determines whether a radio frequency signal is being received and whether that signal contains the identification number of the mobile transmitter to be localized. If so, an identification control generation unit 624 generates an identification control signal along line 607 to enable the identification specific integration unit 606.

Identification specific integrator unit 606 integrates for an arbitrary time period T to obtain a phasor pair $$U = \int_{\{T\}} w(t)u(t)dt; \text{ and}$$

$$V = \int_{\{T\}} w(t)v(t)dt;$$

where w(t) is a dynamically determined, non-linear weighting function that depends upon the identity, amplitude and phase of the phasor samples. For example, when more than one transmitter shares a single frequency channel through time division multiplexing, the processing is time gated so that the (U,V) pair for each particular transmitter is accumulated only during those identified intervals when the signal from that transmitter is active in the channel. As illustrated in FIG. 6, the identification control signal 607 is generated by fully processing the detected, demodulated and time and frequency demultiplexed and decoded output of one element of the antenna array so as to exploit the amplitude threshold and transmitter identification information contained thereon. For a cellular telephone system, the complete set of signal identification functions 508 may be implemented in a CE-4400 signal analysis device manufactured by Cushman Electronics, Inc. of San Jose, Calif.

Additionally, a dynamically estimated form of the probability density function for the phase angles may be selectively evaluated by performing a selective phase transform at step 609 from the signal samples that are stored in RAM memory so as to detect the presence of multipath interference. Upon subsequent processing, the integration weights are made functionally dependent upon both amplitude and phase thresholds of the measured signal. With the non-linear weighting function w(t), the (U,V) for each transmitted frequency is obtained by integrating the set of time intervals from each mobile transmitter with effective cumulative duration of T. The desired phase angle measurement p is processed in step 609 according to the relationship $$p = \tan^{-1}(U/V).$$

A direction angle transform at step 610 obtains the measurement of the angle of direction by applying the relationship $$a = \sin^{-1}[pc/2\pi fb].$$

Finally, the direction angle transform may calibrate the direction angle with respect to a reference direction, such as north and compensates for any corrections for the orientation of the antenna elements. The output from steps 610 contains the direction angle bearing of the mobile transmitter from the support land station.

The preferred embodiment of the present invention expresses measurements of the angle of direction in relation to the precision of each phase measurement which is related to the signal to noise ratio (SNR) of the extracted signal from each antenna element. The SNR for each antenna element is presumptively the same since the elements are preferably spaced within a wavelength of each other. Given an SNR which is sufficiently above zero dB for a phasor signal obtained from a bandwidth B with an effective integration time T, the relationship of the phase precision to the SNR is expressed as:

$$s.d._p = \sin^{-1}[(1/SNR)\sqrt{(SNR + 0.5)/(TB)}\ ]$$

The particular choice of processing parameters may be evaluated with the aid of the foregoing expression. In a cellular telephone system, for example, the response signals of a control channel are continuously available and have a duration of 50 milliseconds with a trailer duration of at least 25 milliseconds so that each phase measurement may involve integrating the signal for at least 50 milliseconds. Given a cellular channel spacing of 30 kHz, the IF bandpass process may be presumed to obtain 20 kHz. Further, SNR is normally adjusted to maintain a standard operating value of +18 dB and a minimum SNR of at least +12 dB. Given an equilateral antenna configuration discussed above, the standard deviation works out to be less than or equal to 0.29° which corresponds to a tangential uncertainty of approximately 50 meters when the vehicle is located 10 kilometers from the support land station.

FIG. 8 is a simplified block diagram of the principal components required to implement the digital signal analysis of the present invention. The RF signal from lines 508,509 forms the input of digital signal acquisition unit 801. FIG. 9 shows the composition of the digital signal acquisition unit. The analog signal from the IF strip supplies an input to isolation amplifier and buffer 902 and a sample and hold unit 903 which serves to "freeze" the analog signal. An analog-to-digital converter unit ADC 904 receives the output from the sample and hold unit 903 and supplies an input to a memory buffer unit 905 that has a FIFO first in, first out management structure. Digital signal acquisition unit 801 passes, on an interrupt service control basis, the appropriate digital signal information under the control of the digital signal processor unit 807.

The ADC 904 may comprise any of a number of analog-to-digital converter units such as the A/D-/A/M-724 from analogic Corp. of Wakefield, Mass. or a "flash" ADC such as the TDC1029 from TRW Corporation of La Jolla, Calif. The A/D/A/M-724 has a sampling rate of 100 kHz with a precision of 14 bits per sample. In comparison, the TDC1029 has a sampling rate of 100 MHz and 6 bit precision but requires virtually no buffering from sample and hold unit 903. The relative speed, precision and cost of the ADC units with their associated buffering units are design considerations for a particular system. Generally, the higher signal sampling rates obtained for wider bandwidth signals require fewer mixing stages in the analog receiver circuit shown in FIG. 5. Higher signal sampling rates also produce more precise signal and angle measurements for low SNR. A higher sampling rate requires faster arithmetic computation and, possibly, a larger FIFO memory buffer 905. In general, however, the amount of analog signal processing should be minimized.

Once acquired, the digitized data signals pass from digital signal acquisition unit 801 through interface unit 814 to digital signal processor 809. Signal processor 809 preferably has an integrated configuration such as the Vortex two board set manufactured by Sky Computers, Inc. of Lowell, Mass. and TMS 320C25 chip manufactured by Texas Instruments of Dallas, Tex. The signal processor typically provides 10 million multiplications and additions per second. The Vortex produce a floating point output and the TMS 320 results in a fixed point integer format. Both units contain a signal processor controller unit 807, a memory unit 806 and an arithmetic processing unit 808 connected along a common signal processor bus 805.

The output of signal processor 809 is fed through an interface unit to a control processor data bus 812. Overall management and control of the localization processing at the support station is implemented by support control processor 810. The control processor, in combination with memory unit 811 and network interface unit 813, preferably comprise the types of 32 bit microprocessor based elements discussed in connection with the control station apparatus. Assignment commands for each support station are sent along the control network and stored in RAM memory unit 811. The list of localization assignments for which the land station is responsible is maintained and updated in response to control station commands. In addition, the support processor collects information from the signal identification processing unit 814 which responds to the identification code of a mobile transmitter station received along line 508,509. Signal identification processor 814 may comprise a CE-4400 monitor unit from the Cushman Electronics Corporation of San Jose, Calif. or any standard signal detection and identification unit implemented with the aid of a signal processor 809.

Each time signal processor 809 obtains the measurement of a direction angle for an assigned mobile transmitter station, a measurement-identification-time (MIT) message is formed in the support control processor 810. The MIT message combines data for the direction angle with the identification number of the mobile transmitter station and the identification number of the support land station and the approximate time at which the direction angle measurement was made. It is to be appreciated that the timing measurements need have only enough accuracy to uniquely identify the emission from the mobile transmitter from which the direction angle measurement was made, which typically corresponds to an accuracy of a few seconds. The data measurements are sent to the control land station through interface unit 813.

The preferred embodiment of the present invention preferably selects measurements of direction angles from 5 to 7 land stations so as to avoid the sensitivities to multipath interference. The set of angle measurements is analyzed with standard, non-linear least squares procedures as discussed above. Additionally, the calculations may include information on signal strength as a rough indication of distance of the mobile transmitter station from any particular land station or information on inter-station or stimulated signal arrival time differences as an indication of distance relations as available.

The relationship of a particular angle of direction from a land station having a know location to a mobile transmitter station is a non-linear function of the location coordinates. Therefore, the present invention uses iterative non-linear calculations to derive the position of the mobile transmitter station. These procedures are summarized by Sorenson, *Least-Squares Estimation: From Gauss to Kalman,* IEEE Spectrum, No. 7, July 1970, and references cited therein, all of which are incorporated herein by reference. Given a determination of position, a CHI-squared confidence level is determined with respect to the number of degrees of freedom to determine whether the measurement data has an acceptable level of internal consistency. Measurements containing large residuals are discarded in calculating subsequent solutions.

The foregoing evaluation procedure, when used with the signal processing already described, provides a localization system which is particularly insensitive to errors introduced by multipath interference.

The method of estimating the position according to the present invention involves establishing a perimeter of uncertainity in the information corresponding to a 2×2 covariance matrix. The standard deviation of each parameter is obtained by the square root of the appropriate diagonal element of this matrix. An area of uncertainity corresponds to $\pi$ times the square root of the determinant of the covariance matrix. The covariance and confidence level information is stored under the same label as the location information.

The precision of any particular localization with the present invention depends on several factors, such as the relative orientation of the mobile transmitter station with respect to the antenna elements and the number of measurements used to determine position. The covariance matrix itself is the inverse of a Fisher information matrix that is attained by adding the contributions from all sets of independently measured data. Thus, the standard deviation of the location of the mobile transmitter station is inversely proportional to the square root of the number of measurements. If only two measurements are used and the angles of measurement cross at right angles with respect to one another, the standard deviation of each coordinate positioned perpendicular to the line of bearing equals the standard deviation of the direction angle measurement multiplied by the distance from the receiving antenna to the mobile location. As described above, the standard deviation corresponds to 50 meters at a distance of 10 kilometers from an antenna site.

It should now be readily apparent that a person of ordinary skill in the art may implement appropriate data processing routines to perform the above described mathematical computations.

The principles, preferred embodiments and modes of operation of the present invention have been described in the foregoing specification. The invention which is intended to be protected herein should not, however, be construed as limited to the particular forms described, as these are to be regarded as illustrative rather than restrictive. Variations and changes may be made by those skilled in the art without departing from the spirit of the invention. Accordingly, the foregoing detailed description should be considered as exemplary in nature and not as limiting to the scope and spirit of the invention set forth in the appended claims.

What is claimed is:

1. A localization system for determining the position of a mobile radio transmitter station using a network of interconnected land stations having known locations, comprising:

an antenna array configuration at at least two land stations for receiving radio frequency (RF) signals emitted from the mobile radio transmitter station, said configuration comprising at least one pair of antenna elements, each antenna element positioned to transform the RF signal into a corresponding RF electrical signal;

means for measuring a direction angle of the mobile radio transmitter station from at least two land stations by phase difference measurement, including means for performing a phase sensitive weighted integration of a complex conjugate product of an equivalent analytic signal wave form of the RF electrical signal in each antenna element; and means for processing said direction angle measurements from said at least two land stations to determine a location for the mobile radio transmitter 2. The localization system as claimed in claim 1, further comprising more than two land stations.

3. The localization system as claimed in claim 1, wherein:

said mobile transmitter station is a cellular telephone;

said land stations comprise a cellular telephone network, and said RF signal corresponds to a protocol or communication message from the cellular telephone to the cellular telephone network.

4. The localization system as claimed in claim 1, wherein said means for determining a direction angle of the mobile transmitter station comprises digital electronics.

5. The localization system as claimed in claim 1, wherein said means for determining a transmitter location from direction angle measurements includes measurement consistency analysis by determining a CHI-squared confidence level in the direction angle measurements.

6. The localization system as claimed in claim 1, wherein said means for processing said direction angle measurements further comprises means for nonlinearly weighting said direction angle measurements in accord with the identity or the amplitude of the RF electrical signal.

7. A method of locating a mobile radio transmitter station using a network of interconnected land stations having known locations, comprising the steps of:

receiving radio frequency (RF) signals at at least two land stations that are emitted from the mobile radio transmitter station, said configuration comprising at least one pair of antenna elements, each antenna element positioned to transform the RF signal into a corresponding RF electrical signal;

measuring a direction angle of the mobile radio transmitter station from at least two land stations by performing a phase difference measurement, including the step of integrating a phase sensitive weighting function having a complex conjugate product of an equivalent analytic signal wave form of the RF electrical signal in each antenna element; and processing said direction angle measurements from said at least two land stations to determine a location for the mobile radio transmitter station.

8. The method of locating a mobile radio transmitter station as claimed in claim 7, wherein said step of receiving the radio frequency signals comprises receiving protocol or communication messages of a cellular telephone to a cellular telephone network.

9. The method of locating a mobile radio transmitter station as claimed in claim 7, wherein said step of processing said direction angle measurements further comprises the step of nonlinearly weighting said direction angle measurements in accord with the identity or the amplitude of the RF electrical signal.

* * * * *